US00RE42280E

(19) United States
(12) Reissued Patent
Leykin et al.

(10) Patent Number: US RE42,280 E
(45) Date of Reissued Patent: Apr. 12, 2011

(54) BUN DISPENSING DEVICE FOR HOT DOG DISPENSING MACHINE

(75) Inventors: Leonid Leykin, Baltimore, MD (US); Aleksandr Kofman, Rockville, MD (US)

(73) Assignee: LHD Vending Systems, Inc., Alexandria, VA (US)

(21) Appl. No.: 10/740,903

(22) Filed: Dec. 22, 2003

Related U.S. Patent Documents

Reissue of:
(64) Patent No.: 6,619,503
Issued: Sep. 16, 2003
Appl. No.: 09/953,747
Filed: Sep. 17, 2001

(51) Int. Cl.
*G07F 11/66* (2006.01)

(52) U.S. Cl. ..... 221/25; 221/73
(58) Field of Classification Search ..... 221/25, 221/73, 13, 15, 26, 84, 64
See application file for complete search history.

(56) References Cited

U.S. PATENT DOCUMENTS

| | | | | | |
|---|---|---|---|---|---|
| 3,027,047 | A | * | 3/1962 | Johnson | 221/25 |
| 3,482,733 | A | * | 12/1969 | Groves | 221/25 |
| 3,667,373 | A | * | 6/1972 | Sicher et al. | 99/407 |
| 3,817,422 | A | * | 6/1974 | Raitt | 221/74 |
| 3,984,030 | A | * | 10/1976 | Morini | 221/74 |
| 4,146,150 | A | * | 3/1979 | Low et al. | 221/30 |
| 4,194,646 | A | * | 3/1980 | Oglander et al. | 221/73 |
| 4,434,911 | A | * | 3/1984 | Sakura | 221/73 |
| 4,585,144 | A | * | 4/1986 | Granzow et al. | 221/7 |
| 5,045,660 | A | * | 9/1991 | Levinson | 219/731 |
| 5,065,894 | A | * | 11/1991 | Garland | 221/25 |
| 5,400,699 | A | * | 3/1995 | Cailbault | |
| 5,752,623 | A | * | 5/1998 | Reid | 221/150 HC |
| 6,383,542 | B1 | * | 5/2002 | Khodor et al. | |
| 6,474,527 | B2 | * | 11/2002 | Miller | 226/32 |

FOREIGN PATENT DOCUMENTS

| | | | | |
|---|---|---|---|---|
| DE | 1205888 | * | 11/1995 | 221/73 |
| EP | 000581654 | * | 2/1994 | 221/25 |
| FR | 842909 | * | 3/1939 | 221/73 |
| FR | 1130622 | * | 10/1956 | 221/73 |

OTHER PUBLICATIONS

Declaration of Leon Leykin with attachment 1 (pp. 1, 21A, and 26A) (Jul. 19, 2002).*

* cited by examiner

*Primary Examiner*—Patrick Mackey
*Assistant Examiner*—Michael E. Butler
(74) *Attorney, Agent, or Firm*—DLA Piper LLP US

(57) ABSTRACT

A bun dispensing device for a hot dog dispensing machine operative for dispensing buns from a bun containing element which includes a plurality of individual bun containers and a common film to which the bun containers are releasably attached one after the other, the device has a unit for pulling the bun containing element, a unit for separating the bun containers with buns accommodated therein from the film of the bun containing element and located upstream of the pulling a unit, and a unit for guiding the bun containing element and located upstream of the separating unit, the separating unit being formed so that each of the bun containers with the bun accommodated therein is individually separated from the film under the action of the separating unit.

26 Claims, 9 Drawing Sheets

BUN DISPENSING DEVICE FOR HOT DOG DISPENSING MACHINE

Matter enclosed in heavy brackets [ ] appears in the original patent but forms no part of this reissue specification; matter printed in italics indicates the additions made by reissue.

BACKGROUND OF THE INVENTION

The present invention relates to a bun dispensing device for a hot dog dispensing machine.

Dispensing devices are generally known in the art. They can be further improved specifically to adapt the dispensing devices for dispensing buns in a hot dog dispensing machine in which the buns are dispensed, the sausages are dispensed, the sausages are placed on the buns and dispensed from the machine as hot dogs.

SUMMARY OF THE INVENTION

Accordingly, it is an object of the present invention to provide a bun dispensing device which can be used for a hot dog dispensing machine.

In keeping with these objects and with others which will become apparent hereinafter, one feature of present invention resides, briefly stated, in a hot dispensing device which has means for pulling the bun containing element; means for separating the bun containers with buns accommodated therein from the film of the bun containing element and located upstream of said pulling means; and means for guiding the bun containing element and located upstream of said separating means, said separating means being formed so that each of the bun containers with the bun accommodated therein is individually separated from the film under the action of said separating means.

When the bun dispensing device is designed in accordance with the present invention, it provides a position-accurate and timely dispensing of buns for producing and dispensing of hot dogs.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF PREFERRED EMBODIMENTS

Figure 1:
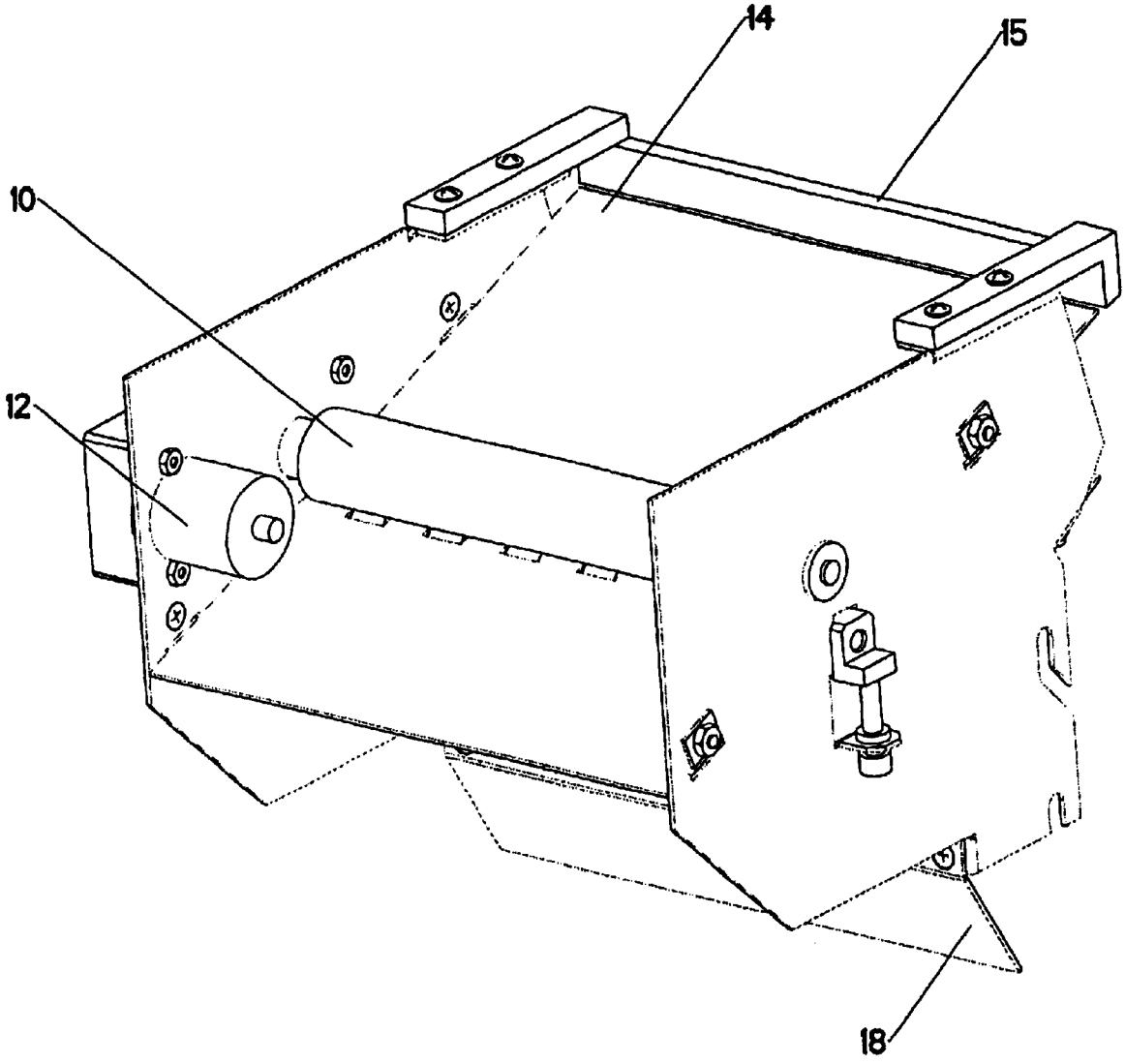
FIG. 1 is a perspective view showing pulling means of a mechanism for bun dispensing device for hot dog dispensing machine.
Figure 2:
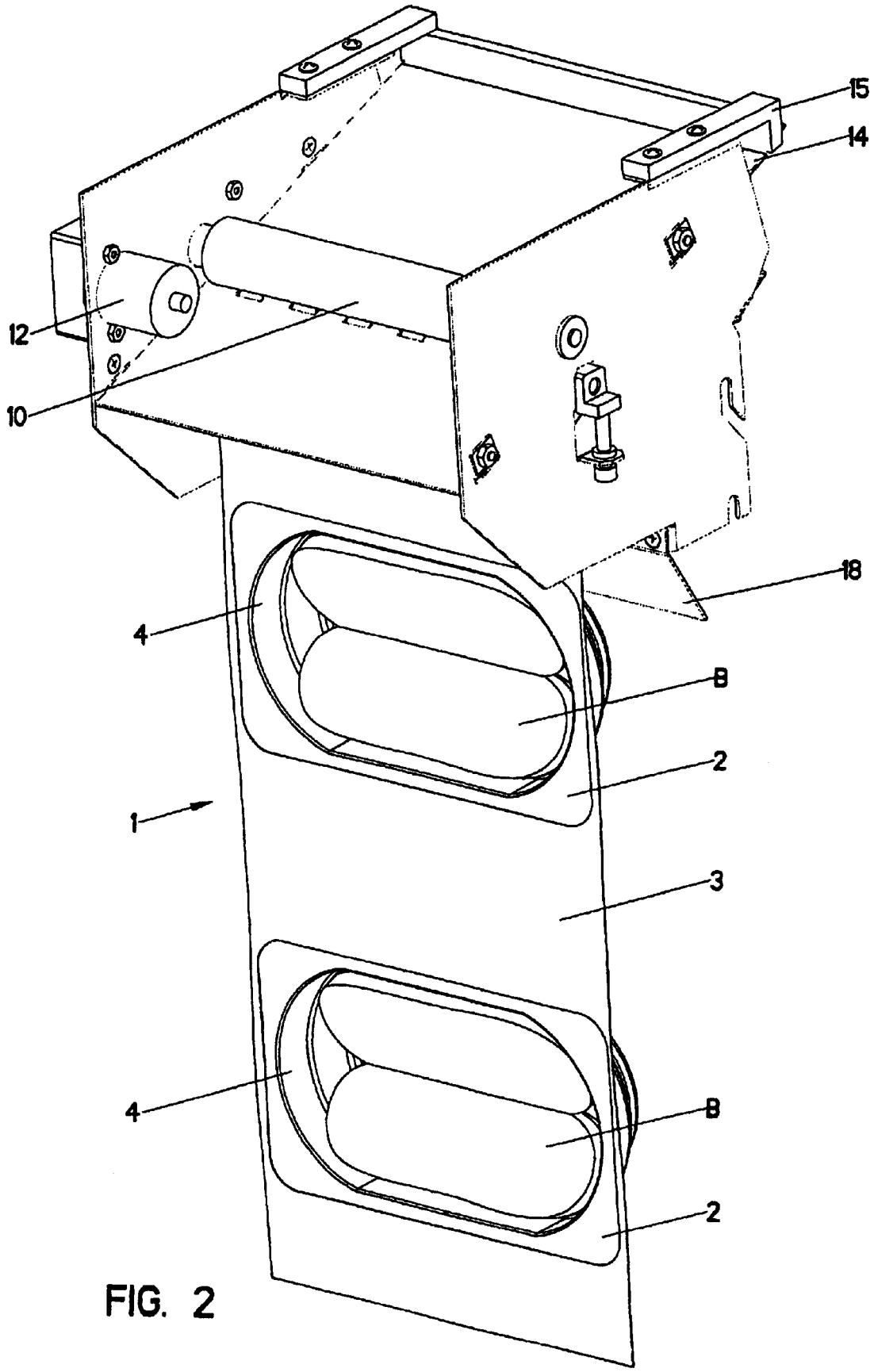
FIG. 2 is a view substantially corresponding to the view of FIG. 1, but showing the pulling means in an operation with a bun containing element pulled by it.
Figure 3:
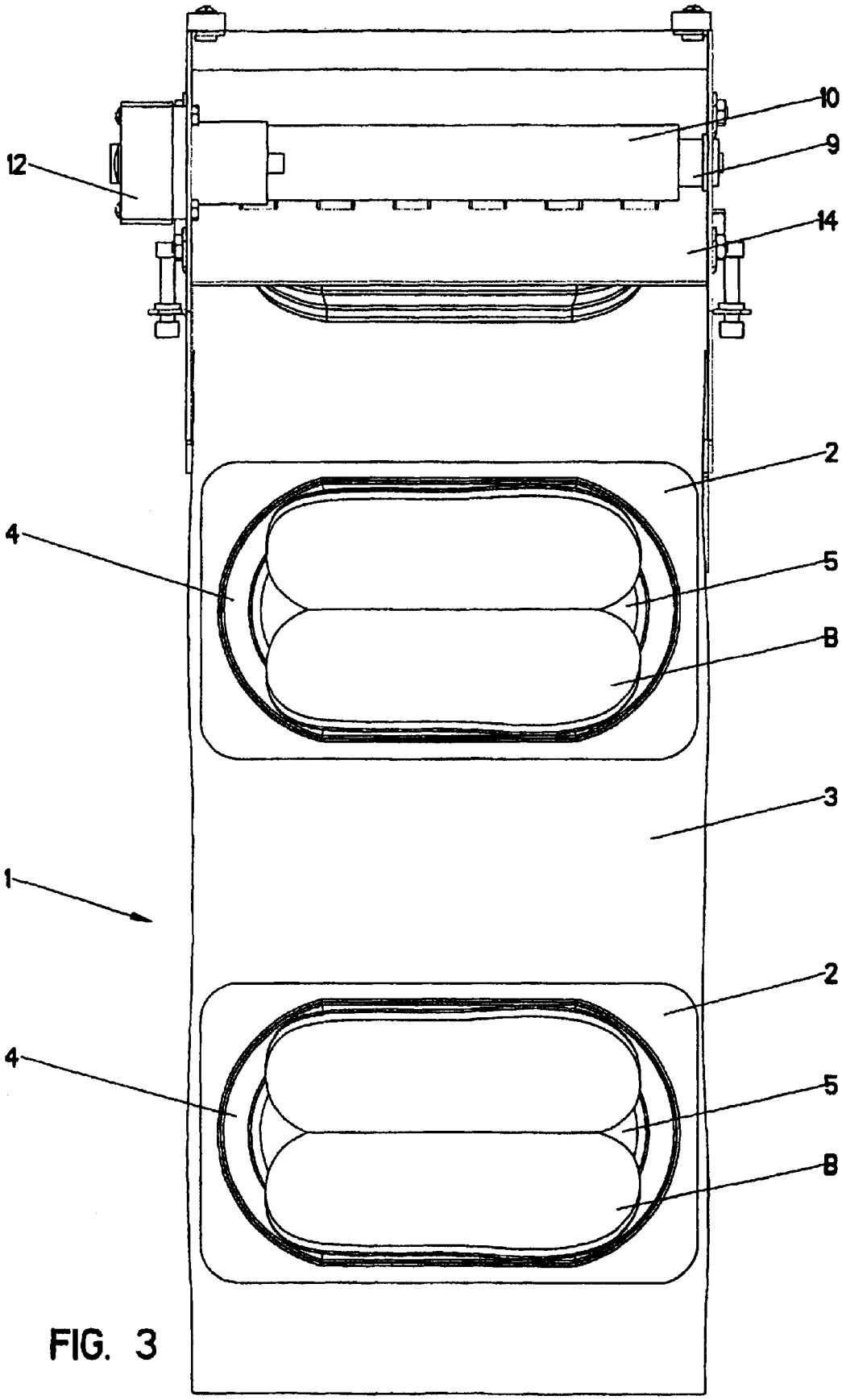
FIG. 3 is a front view of the pulling means of FIG. 2.
Figure 4:
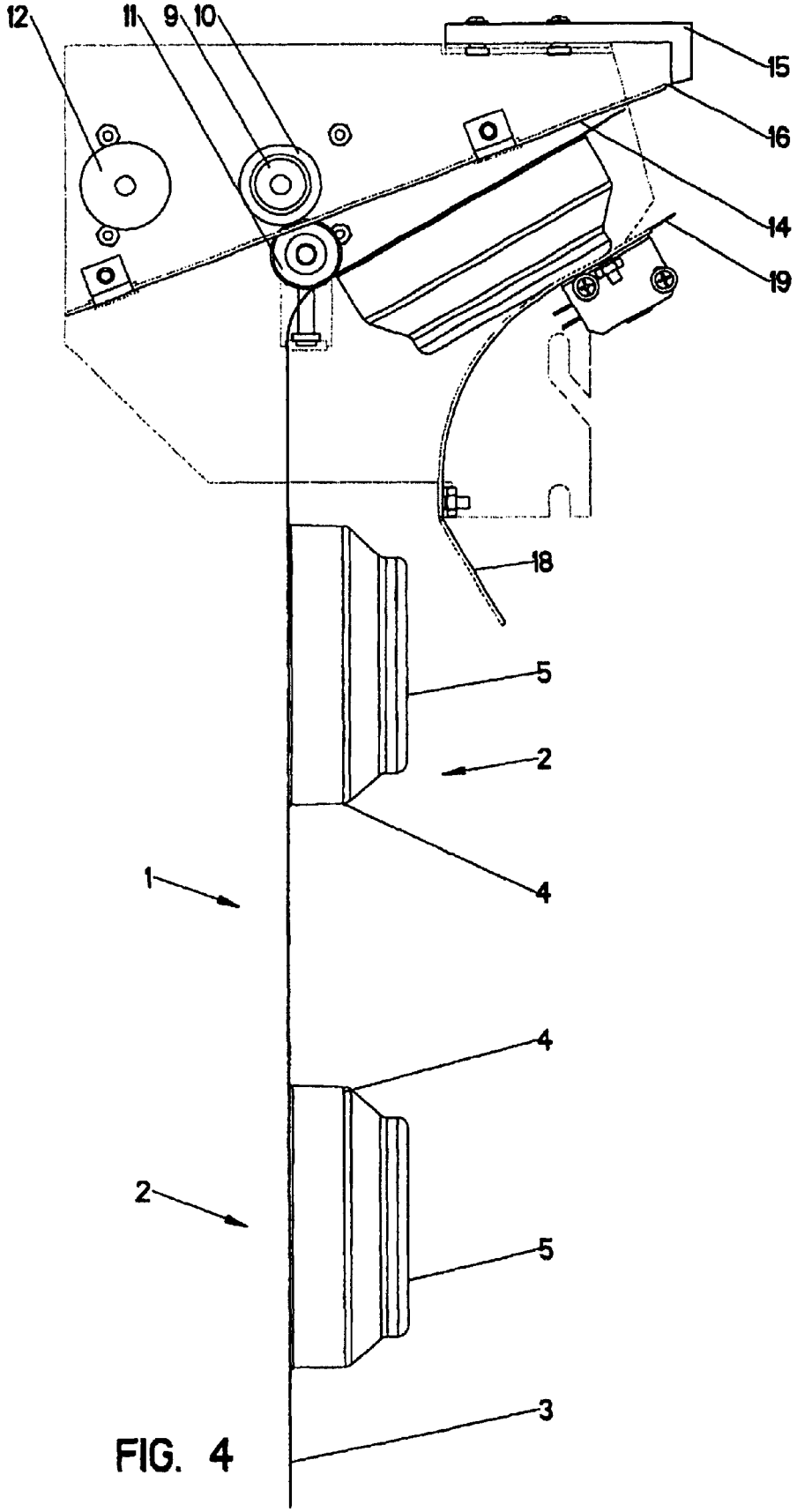
FIG. 4 is a side view of a bun dispensing device in accordance with the present invention.
Figure 5A:
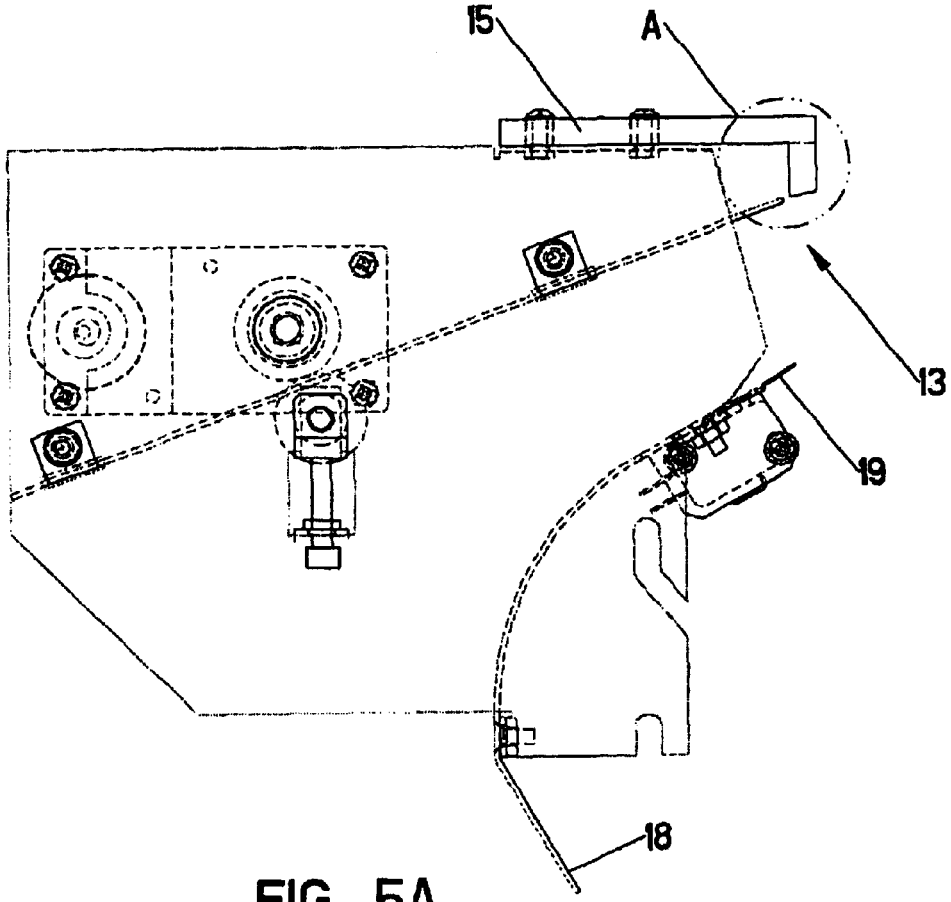
FIGS. 5A and 5B are side view and detailed scaled view showing the pulling means and the separating means of the inventive bun dispensing device.
Figure 5B:
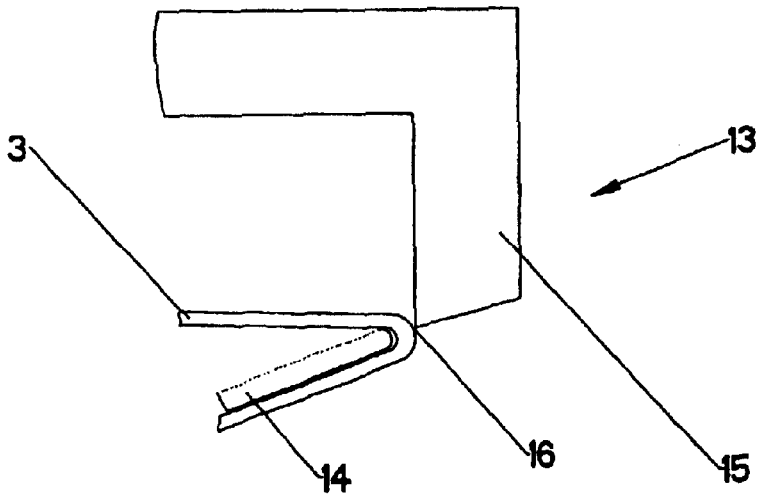

A bun dispensing device in accordance with the present invention issued for dispensing buns from a bun containing element which is identified as a whole with reference numeral 1. The bun containing element 1 has a plurality of bun containers 2 which are fixed on a continuous film 3, for example by glueing. Each bun container 2 has a peripheral wall 4 and a bottom 5 which define together a cavity 6 for accommodating a bun B. The bottom 5 can be provided with a projection 7 for supporting the bun B in its central region, while the sides of the bun B are supported on the peripheral wall 4.

The bun dispensing device is provided with pulling means which is identified as a whole with reference numeral 8. The pulling means 8 include a roller 9 provided for example with a rubber coating 10 for increasing adhesion, a roller 11, and a motor 12 for driving the roller 9 through a transmission. When an end of the film 3 of the bun containing element is introduced between the rollers 9 and 11 and the roller 9 is driven in rotation by the motor, the film 1 is pulled by the pulling means 8.

Figure 6:
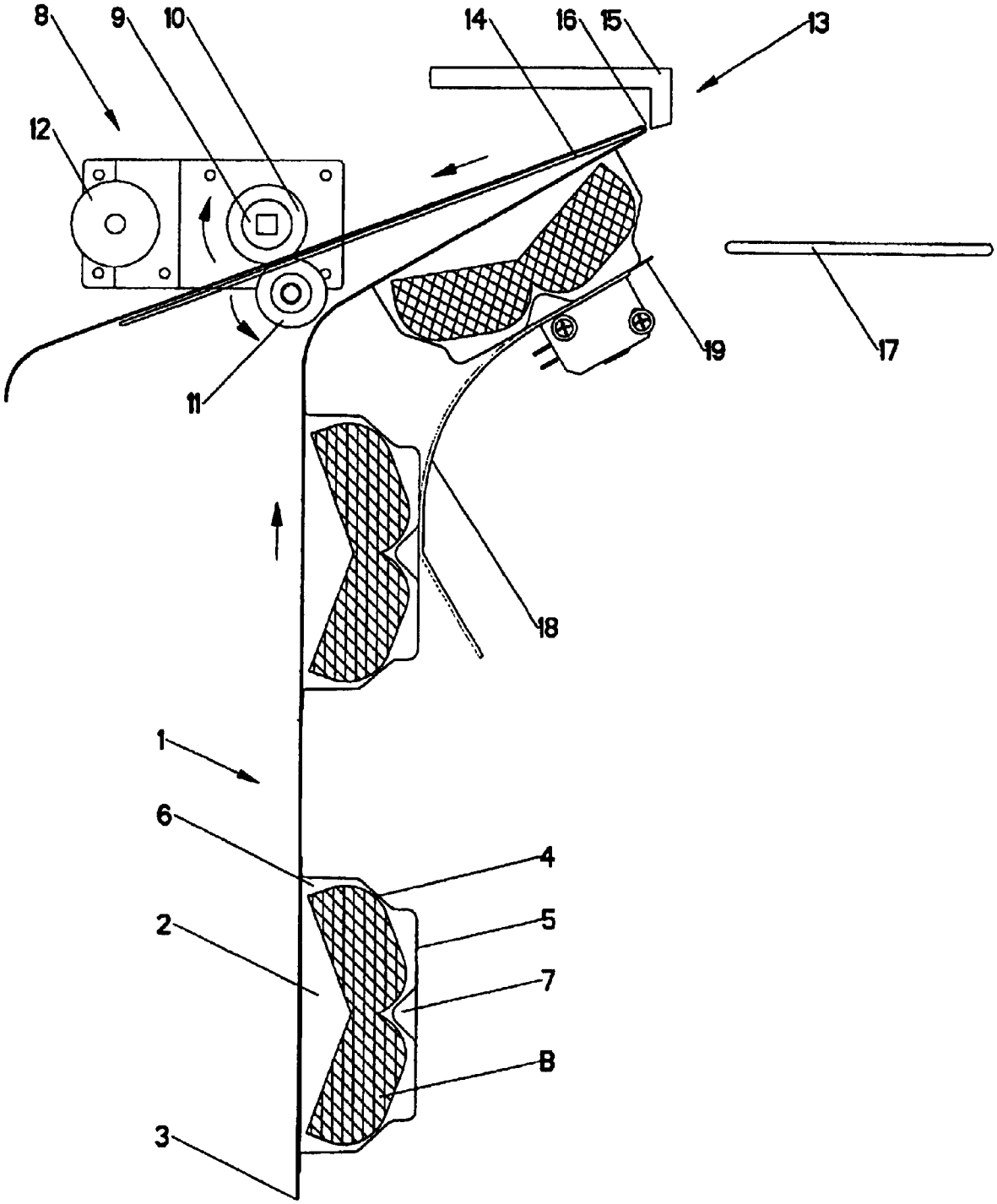
FIG. 6 is a view showing a beginning of a process of separation of a bun container from the film of the bun containing element.
Figure 7:
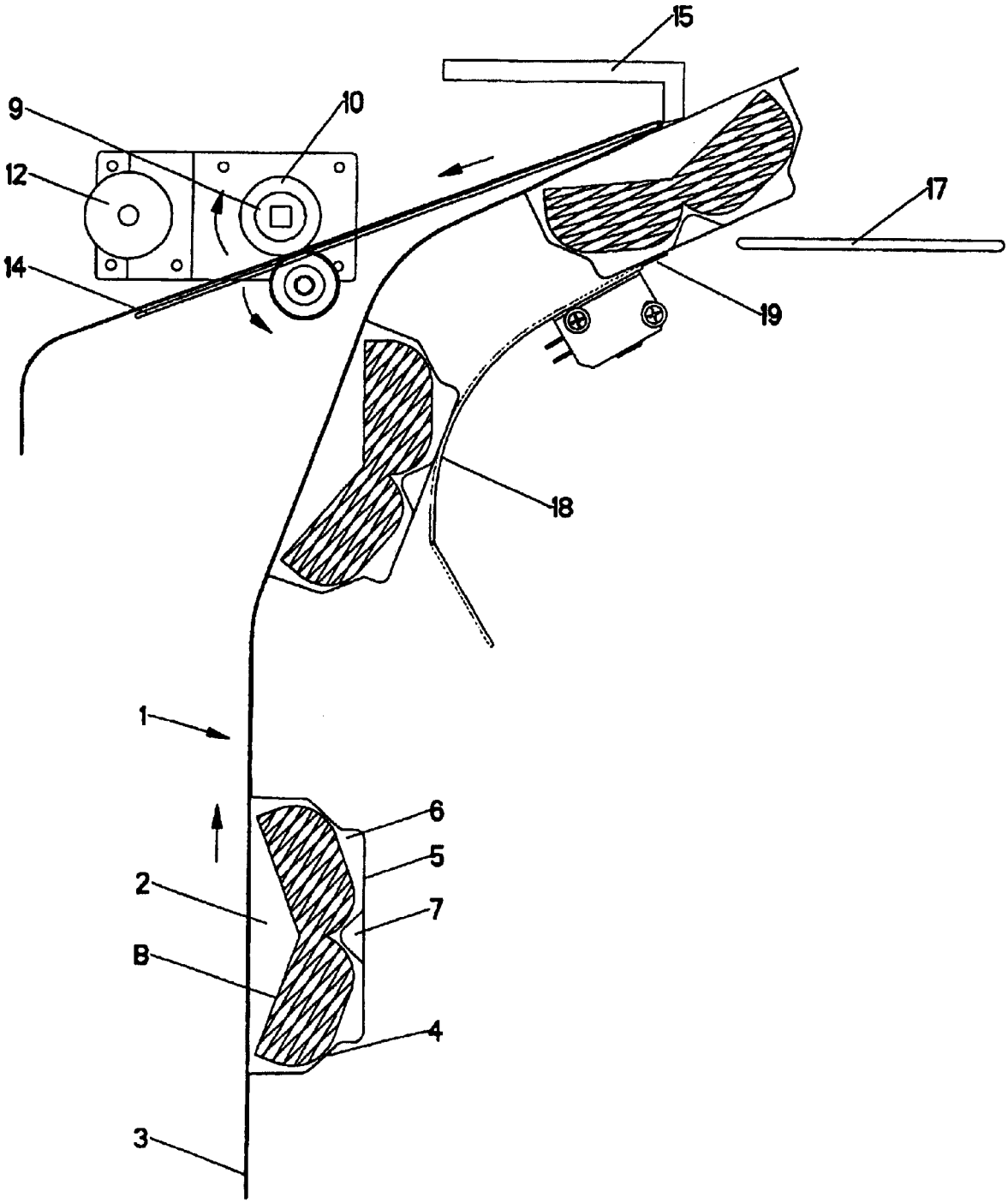
FIG. 7 is a view showing a further stage of the separation of the bun container from the film of the bun containing element.
Figure 8:
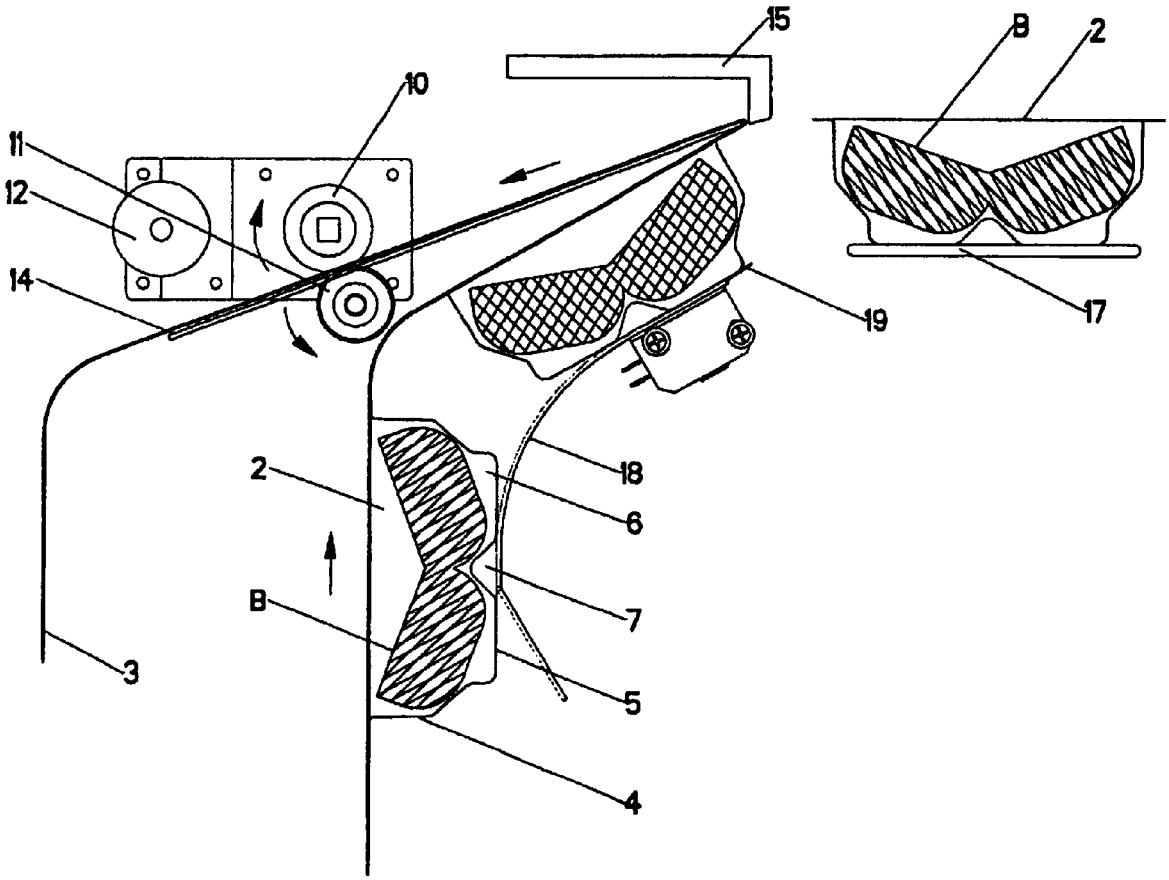
FIG. 8 is a view showing a final stage of the separation of the bun container from the film of the bun containing element.
Figure 9A:
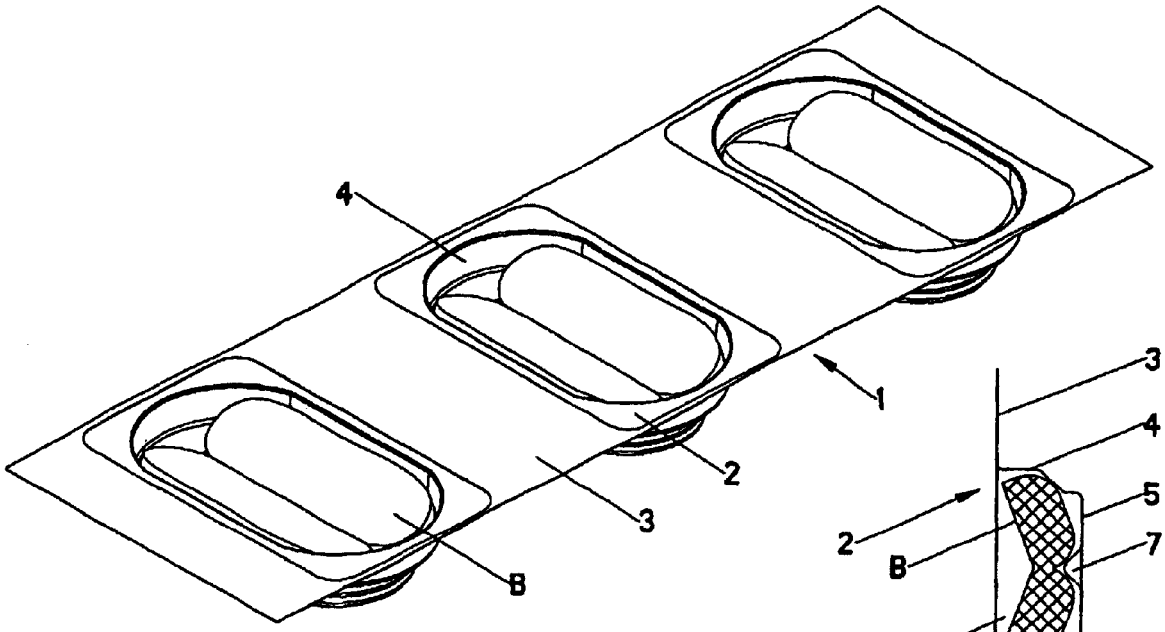
FIGS. 9A and 9B are perspective view and a side view of a bun containing element which is used for operation of the inventive bun dispensing device.
Figure 9B:
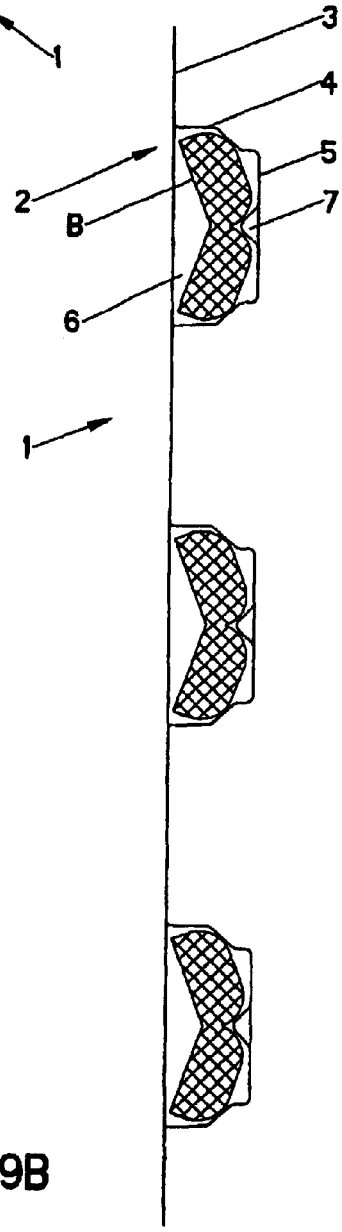

The bun dispensing device further has separating means for separating the bun containers 2 from the film 3. The separating means 13 include a guide 14 and a bracket 15 which are spaced from one another so as to form a small gap 16 therebetween. The guide 14 serves for guiding the film 1 over it toward the rollers 9 and 11. In the area of the rollers, the guide 14 is provided with an opening. At the same time the guide 14 serves as a part of the separating means. When the film 3 of the bun containing element 1 is introduced through the gap 16 over the guide 14 between the rollers 9 and 11, the rollers rotate and pull the film 3 to the left. In FIG. 6, the bun containers 2 which can not pass through the gap are separated from the film 1 and deposited on a platform which is identified with reference numeral 17. The separating means 14 is arranged upstream of the pulling means 8.

The bun dispensing device is further provided with guiding means which is identified with reference numeral 18. The guiding means can be formed as a simple curved guide over which the bun containers 2 are guided during movement of the bun containing element 1 and pulling of the film 3 by the pulling means 8. As can be seen from the drawings, the guiding means 18 is located upstream of the separating means 13 and the pulling means 8. The guide 18 is also located so that the bun containing element 1 is guided in one direction, in particular from left to right in FIG. 6, while the film 3 is pulled by the pulling means 8 in the opposite direction, in particular from right to left in FIG. 6.

In accordance with the present invention, the bun dispensing device has means for periodically stopping and moving the pulling means. It includes a switch which is identified with reference numeral 19 and connected with the motor 12. The switch operates automatically so that when the bun container 2 is separated from the film 3 and placed on the platform 17 the switch 19 stops the motor 12, and thereafter after a predetermined period of time again resumes rotation of the roller 9 and therefore pulling of the film 3 for separation of the next bun container 2 from the film 3.

It will be understood that each of the elements described above, or two or more together, may also find a useful application in other types of constructions differing from the types described above.

While the invention has been illustrated and described as embodied in bun dispensing mechanism for hot dog dispensing machine, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

What is claimed is:

1. A bun dispensing device for a hot dog dispensing machine operative for dispensing buns from a bun containing element [which includes a plurality of individual bun containers and a common film to which the bun containers are releasably attached one after the other], the device comprising

*pulling* means for pulling the bun containing element*, the bun containing element including a plurality of bun containers each having a bun accommodated therein and a common film to which the bun containers are releasably attached, such that the common film seals an opening of each bun container when the bun container is attached to the film;*

*separating* means for separating the bun containers with buns accommodated therein from the film of the bun containing element and located upstream of said pulling means*, said separating means being formed so that each of the bun containers with the bun accommodated therein is individually separated from the film under the action of said separating means*; and

*guiding* means for guiding the bun containing element and located upstream of said separating means[, said separating means being formed so that each of the bun containers with the bun accommodated therein is individually separated from the film under the action of said separating means]*;*

*wherein said separating means includes a first element having an edge over which the film passes and a second element spaced apart from the first element so as to form a gap through which the film of the bun containing element passes, the second element having a surface in a substantially planar relationship to a portion of the first element adjacent to the edge, the first element and the second element being arranged so that during pulling of the bun containing element by said pulling means only the film passes through said gap and a respective one of the bun containers is separated from the film such that the opening of the bun container sealed by the film is unsealed and such that the bun container is spaced apart and disconnected from other bun containers, the edge of the separating means being located at a point at which film is separated from the bun container; and*

*wherein the pulling means and the guiding means are arranged such that the film changes direction, and each bun container is below the film, at the point at which film is separated from the bun container.*

[2. A bun dispensing device as defined in claim 1, wherein said separating means include a first element and a second element spaced from one another so as to form a gap through which the film of the bun containing element can pass, so that during pulling of the bun containing element by said pulling means only the film passes through said gap and a respective one of the bun containers is separated from the film.]

3. A bun dispensing device as defined in claim [2] *1*, wherein one of said elements is formed as a guiding element which guides the film from said separating means to said pulling means.

4. A bun dispensing device as defined in claim 1, wherein said guiding means include a guiding element which supports the containers of the bun containing element at a side which is opposite to the film.

5. A bun dispensing device as defined in claim 1[; and], further comprising a supporting element onto which the bun containers after being separated from said film are supplied.

6. A bun dispensing device as defined in claim 1, wherein said guiding means and said pulling means are formed so that the bun containing element including the film with the containers is guided in one direction, while said pulling means pull the film without the containers in a direction opposite to said one direction.

7. A bun dispensing device as defined in claim 1, wherein said pulling means include at least two rolling elements forming a working gap there between, so that the film can be introduced between said rolling elements and during rotation of said rolling elements in a predetermined direction pulled by said rolling elements.

8. A bun dispensing device as defined in claim 1[; and], further comprising means for stopping said pulling means after separation of a respective one of the containers, and again resuming pulling of said bun containing element for separation of a next one of the bun containers, said pulling means including motor means and said means for stopping and resuming including switch means operatively connected with said motor means.

9. A bun dispensing device as defined in claim 1, wherein said guiding means include a guiding element provided with a formation interengagable with a formation of a respective one of the bun containers.

10. A bun dispensing device, comprising:

a guide for guiding a film having attached bun containers *so as to seal an opening in each of the bun containers*, the guide having [an] *a guide* edge;

a bracket located adjacent the guide edge *and having a bracket surface in a substantially planar relationship to a portion of the guide adjacent to the guide edge*, wherein the bracket and the guide edge form a slot opening; and a film pulling mechanism for pulling the film through the slot opening, the film being pulled in a first direction *by the film pulling mechanism* prior to entering the slot opening*, the film pulling mechanism being located downstream of the guide edge*;

wherein the film passes through the slot opening and about the guide edge, such that the film approximately reverses direction from the first direction, *the guide edge being located at a point at which film is separated from the bun container* and wherein the bracket separates each of the attached bun containers from the film *so that the opening of each of the containers is unsealed and the bun container is spaced apart and disconnected from other bun containers; and*

*wherein the film pulling mechanism and the guide are arranged such that each bun container is below the film at the point at which film is separated from the bun container.*

[11. A bun dispensing device, comprising:

a guide for guiding a film having attached bun containers, the guide having an edge;

a film pulling mechanism for pulling the film past the guide; and a bun guide for guiding the attached bun containers;

wherein the film and the attached bun containers slidably pass the bun guide in a first direction;

wherein the film passes the guide edge, such that the film approximately reverses direction from the first direction, and wherein the guide separates each of the attached bun containers from the film.]

12. A bun dispensing device, comprising:

a guide for guiding a film having attached bun containers, the guide having [an] *a guide* edge*, the containers each having an opening sealed by the film*;

a bracket located adjacent the guide edge, wherein the bracket and the guide edge form a slot opening*, the bracket having a surface in a substantially planar relationship to a portion of the guide adjacent to the guide edge*;

a film pulling mechanism for pulling the film through the slot opening*, the film pulling mechanism being located downstream of the guiding edge*; and a bun guide for guiding the film and the attached bun containers;

wherein the film and the attached bun containers *are pulled* slidably [pass] *past* the bun guide in a first direction *by the film pulling mechanism*;

wherein the film passes through the slot opening, such that the film approximately reverses direction from the first direction[.]*;* and wherein the bracket separates each of the attached bun containers from the film *such that the bun containers are unsealed and are spaced apart and disconnected from other bun containers, the guide edge being located at a point at which film is separated from the bun container; and*

*wherein the film pulling mechanism and the bun guide are arranged such that each bun container is below the film at the point at which film is separated from the bun container.*

13. The device of claim 12, wherein the film reverses direction upon passing the guide for guiding the film.

14. The device of claim 12, wherein the film pulling mechanism includes:

a first roller;

a second roller frictionally contacting the first roller; and a motor coupled to the first roller for rotating the first roller.

15. The device of claim 14, wherein the film is fed between the first roller and the second roller.

16. The device of claim 14, wherein the first roller is cylindrical, and wherein the second roller is cylindrical.

17. The device of claim 14, wherein at least one of the first roller and the second roller has a flexible surface.

18. The device of claim 17, wherein the flexible surface comprises rubber.

19. The device of claim 12, further comprising:

a platform for receiving at least one of the separated attached bun containers.

20. The device of claim 19, wherein the bun guide guides each of the attached bun containers onto the platform.

[21. The device of claim 12, wherein the film sealably closes each of the attached bun containers prior to the bracket separating each of the attached bun containers from the film.]

22. The device of claim 12, wherein the bun containers are suspended from the film.

23. A bun dispenser, comprising:

a housing containing a film guide having a first side, a second side, and an edge, the film guide having a roller opening;

a first roller disposed in the housing adjacent the roller opening on the first side of the film guide;

a second roller abutting the first roller, the second roller being disposed in the housing adjacent the roller opening on the second side of the film guide;

a motor for rotatably driving the first roller;

a bracket located adjacent the edge of the film guide, such that a slot is formed between the edge of the film guide and the bracket*, the bracket having a bracket surface in a substantially planar relationship to a portion of the film guide adjacent to the edge of the film guide*;

a bun guide located on the second side of the film guide; and a film with attached bun containers, the film and attached bun containers *having an opening sealed by the film, the film and attached bun containers* slidably passing the bun guide[.]*;* wherein the film and bun containers travel approximately parallel to the film guide adjacent the slot;

wherein the film passes through the slot and between the first roller and the second roller;

wherein the rotating of the first roller pulls the film through the slot; [and]

wherein the film passing through the slot separates each of the attached bun containers from the film *such that each bun container is unsealed and is spaced apart and disconnected from other bun containers, the edge of the file guide being located at a point at which the film separates from the bun containers; and*

*wherein the first and second rollers and the guide are arranged such that each bun container is below the film at the point at which film is separated from the bun container.*

24. A method for dispensing buns, comprising:

pulling a film, the film including a first film portion having no attached bun containers and a second film portion having attached bun containers, *each of the containers having an opening sealed by the film,* the second film portion being contiguous with the first film portion, wherein the first film portion is pulled in a first direction and the second film portion is pulled in a second direction;

passing the first film portion past a guide edge *of a film guide*;

the guide edge generally reversing direction of pull of the film, such that the first direction is generally opposite the second direction, wherein each of the attached bun containers in the second film portion is pulled toward the guide edge, the guide edge being located adjacent a bracket*, the bracket having a bracket surface in a substantially planar relationship to a portion of the film guide adjacent to the guide edge*; [and]

separating each of the bun containers from the second film portion by pulling the film past the guide edge and the adjacent bracket *such that the bun container is unsealed and is spaced apart and disconnected from other bun containers, the guide edge being located at a point at which the film and the bun container are separated; and*

*halting the film for a predetermined period of time after each bun container is separated from the second film portion;*

*wherein the film is pulled past the guide edge such that each bun container is below the film at the point at which film is separated from the bun container.*

25. The method of claim [24] *29*, wherein each of the bun containers includes a bun container edge, and wherein separating each of the bun containers from the second film portion by pulling the film past the guide edge includes:

[the guide edge and the bracket, and the generally reversing direction of pull of the film,] separating each of the bun containers from the second film portion at the bun container edge.

26. The method of claim [24] *29*, further comprising:

passing the second film portion with the attached bun containers past a bun container guide.

27. The method of claim [24] *29*, wherein pulling the film includes:

passing the film between two contacting rollers; and rotationally driving one of the two contacting rollers.

28. The method of claim 27, wherein the rotationally driven roller is rotationally driven via a coupled motor.

*29. A method for dispensing buns, comprising:*

*pulling a film, the film including a first film portion having no attached bun containers and a second film portion having attached bun containers, each of the containers having an opening sealed by the film, the second film portion being contiguous with the first film portion, wherein the first film portion is pulled in a first direction and the second film portion is pulled in a second direction;*

*passing the first film portion past a guide edge of a film guide;*

*the guide edge generally reversing direction of pull of the film, such that the first direction is generally opposite the second direction, wherein each of the attached bun containers in the second film portion is pulled toward the guide edge, the guide edge being located adjacent a bracket the bracket having a bracket surface in a substantially planar relationship to a portion of the film guide adjacent to the guide edge; and*

*separating each of the bun containers from the second film portion by pulling the film past the guide edge and the adjacent bracket such that the bun container is unsealed and is spaced apart and disconnected from other bun containers, the guide edge being located at a point at which the film and the bun container are separated;*

*wherein the film is pulled past the guide edge such that each bun container is below the film at the point at which film is separated from the bun container.*

* * * * *